United States Patent
Stoeckl et al.

(10) Patent No.: US 7,113,513 B2
(45) Date of Patent: Sep. 26, 2006

(54) METHOD AND DEVICE FOR TRANSMITTING DATA

(75) Inventors: Werner Stoeckl, Baierbrunn (DE); Michael Tietsch, Kaufering (DE)

(73) Assignee: Siemens Aktiengesellschaft, Munich (DE)

( * ) Notice: Subject to any disclaimer, the term of this patent is extended or adjusted under 35 U.S.C. 154(b) by 795 days.

(21) Appl. No.: 10/022,610

(22) Filed: Dec. 17, 2001

(65) Prior Publication Data

US 2002/0067733 A1 Jun. 6, 2002

Related U.S. Application Data

(63) Continuation of application No. PCT/DE00/01645, filed on May 23, 2000.

(30) Foreign Application Priority Data

Jun. 15, 1999 (DE) ................ 199 27 291

(51) Int. Cl.
*H04L 12/66* (2006.01)
*G06F 15/16* (2006.01)
*H04J 3/16* (2006.01)
*H04L 12/28* (2006.01)

(52) U.S. Cl. ............... 370/401; 370/352; 370/395.52; 370/466; 709/230; 709/249

(58) Field of Classification Search ........... 370/351, 370/352, 389, 392, 395.1, 395.5, 395.52, 370/395.6, 400, 401, 465, 466, 467; 709/227, 709/230, 238, 249
See application file for complete search history.

(56) References Cited

U.S. PATENT DOCUMENTS

| | | | |
|---|---|---|---|
| 5,430,727 A * | 7/1995 | Callon | 370/401 |
| 5,790,548 A * | 8/1998 | Sistanizadeh et al. | 370/401 |
| 5,818,842 A | 10/1998 | Burwell et al. | |
| 5,946,311 A * | 8/1999 | Alexander et al. | 370/395.53 |
| 5,999,536 A * | 12/1999 | Kawafuji et al. | 370/401 |
| 6,061,356 A * | 5/2000 | Terry | 370/401 |
| 6,061,739 A * | 5/2000 | Reed et al. | 709/245 |
| 6,091,732 A * | 7/2000 | Alexander et al. | 370/401 |
| 6,101,182 A * | 8/2000 | Sistanizadeh et al. | 370/352 |
| 6,115,393 A * | 9/2000 | Engel et al. | 370/469 |
| 6,282,201 B1 * | 8/2001 | Alexander et al. | 370/401 |
| 6,339,594 B1 * | 1/2002 | Civanlar et al. | 370/352 |

(Continued)

FOREIGN PATENT DOCUMENTS

EP 0 473 066 A1 3/1992

(Continued)

*Primary Examiner*—Alpus H. Hsu
(74) *Attorney, Agent, or Firm*—Laurence A. Greenberg; Werner H. Stemer; Ralph E. Locher

(57) ABSTRACT

A network gateway unit and method for transmitting data from a first router to a second router through an external communications network, whereby local area networks connected to the router devices can be connected through the network gateway unit, include connecting the first router to the communications network through the network gateway unit. The network gateway unit is used for conversion between a transmission protocol used by the first router and a transmission protocol used in the communications network. A hardware address, which identifies the second router, is allocated to the data as a destination address by the first router. In the network gateway unit, a network address that identifies an exit point from the communications network is allocated to the destination address. Based upon the network address, the data is transmitted to the exit point from the communications network and from there to the second router.

16 Claims, 2 Drawing Sheets

U.S. PATENT DOCUMENTS

| | | | |
|---|---|---|---|
| 6,343,083 B1* | 1/2002 | Mendelson et al. | 370/466 |
| 6,396,833 B1* | 5/2002 | Zhang et al. | 370/392 |
| 6,434,627 B1* | 8/2002 | Millet et al. | 709/245 |
| 6,625,158 B1* | 9/2003 | Alexander et al. | 370/398 |
| 6,628,617 B1* | 9/2003 | Karol et al. | 370/237 |
| 6,959,009 B1* | 10/2005 | Asokan et al. | 370/475 |
| 2002/0052960 A1* | 5/2002 | Trisno et al. | 709/226 |
| 2003/0115345 A1* | 6/2003 | Chien et al. | 709/229 |

FOREIGN PATENT DOCUMENTS

| | | |
|---|---|---|
| EP | 0 835 009 A2 | 4/1998 |
| JP | 11 191 790 A | 7/1999 |
| WO | WO 95/20282 | 7/1995 |

\* cited by examiner

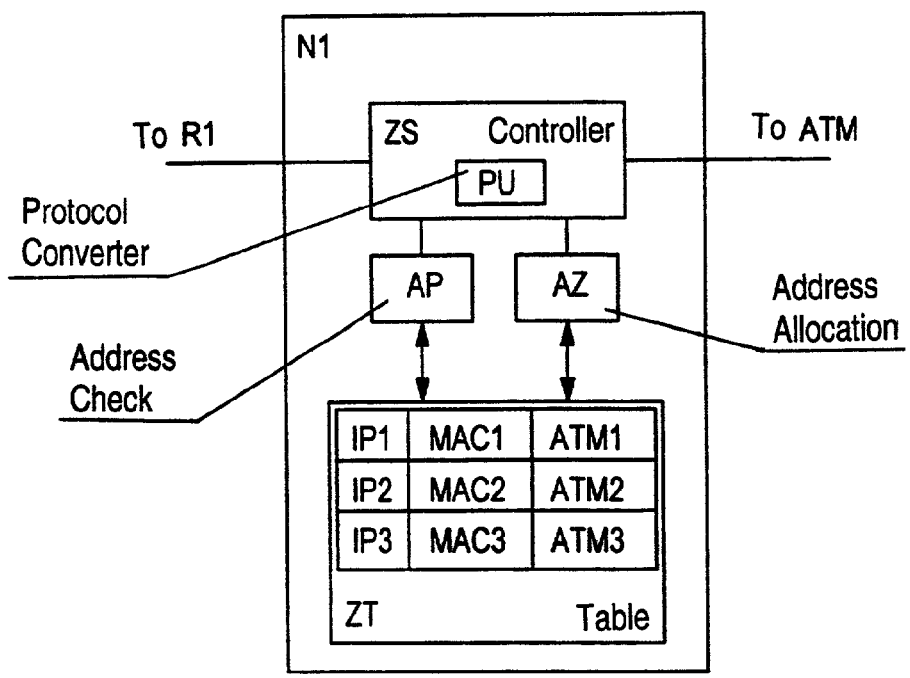

METHOD AND DEVICE FOR TRANSMITTING DATA

CROSS-REFERENCE TO RELATED APPLICATION

This application is a continuation of copending International Application No. PCT/DE00/01645, filed May 23, 2000, which designated the United States.

BACKGROUND OF THE INVENTION

Field of the Invention

The invention relates to a method for transmitting data from a first router device through an external communications network to a second router device, whereby, in particular, local area networks connected to these router devices can be connected. The invention furthermore relates to a network gateway unit to implement the method.

Local area networks, which are also frequently referred to as LANs, can be connected according to conventional practice through router devices. The router devices transmit data packets that are to be exchanged between the local area networks. The data packets are switched at the level of the network layer (layer 3) of the OSI reference model using network addresses that are contained in the data packets and that identify a transmission destination. In such a context, addresses of the network layer are designated as network addresses. A frequently used switching protocol of the network layer is referred to as the Internet Protocol (IP). Based upon the IP, data packets are switched using unique worldwide network addresses, referred to as Internet Protocol addresses, also referred to below as IP addresses.

To switch a data packet with an IP address, the IP address is evaluated by a router device and, depending thereon, a network node as close as possible to the transmission destination is defined in one of the local area networks connected to the router device to which the data packet is next to be transmitted. If the transmission destination is located in one of these local area networks, the network node is already identical to the transmission destination. To transmit the data packet to such a network node, the data packet is provided by the router device with a hardware address that uniquely identifies the network node and is forwarded in the direction of the network node. Using the hardware address transmitted with the data packet, the network node identifies that the data packet is addressed to it and receives the data packet for further processing or for forwarding.

Hardware addresses, which are also referred to as medium access control (MAC) addresses, are unique worldwide addresses that are located at the data link layer (layer 2) of the OSI reference model, and with which network devices—in most cases network cards—are provided by the manufacturers. The hardware address of a network device is permanently stored in the network device and cannot be modified.

According to the prior art, local area networks can also be connected through an external communications network, e.g., a wide area network (WAN) or a "backbone network", preferably, a broadband network. With such a connection of local area networks, the entire data exchange between the local area networks is to be routed through the communications network.

Under the name of IPOA (IP over ATM), a prior art method connects local area networks through an asynchronous transfer mode (ATM) network as a communications network in which data packets provided with IP addresses can be transmitted transparently from a first local area network through the ATM network into a second local area network. Aspects of the method are described, for example, in the Internet specification RFC 2225. In the method, the local area networks that are to be connected are connected respectively to the ATM network through a network gateway unit that serves, inter alia, to convert transmission protocols.

To transmit a data packet provided with an IP address from the first local area network to a transmission destination in the second local area network identified by the IP address, the network gateway unit evaluates the IP address of the data packet. The IP address is used to define the ATM exit network node to which the local area network containing the transmission destination is connected. Such an ATM exit network node is normally the network gateway unit of the local area network. The data packets to be transmitted are then allocated to the ATM address of the network gateway unit and are forwarded into the ATM network, which transmits the data packets to the network gateway unit. Following conversion of the transmission protocol, the data packets are finally transmitted from the network gateway unit into the second local area network to the transmission destination.

The evaluation of IP addresses required to define the routing is a relatively elaborate process and requires routing functionality from the network gateway unit that can generally be implemented only at high switching cost. However, such routing functionality is already contained in conventional router devices for direct connection of local area networks. Because such router devices have now become largely standardized and widespread, these router devices, unlike IPOA-enabled network gateway units, can be manufactured at relatively low cost. It would, therefore, be desirable to be able to use these router devices also for the connection of local area networks through an external communications network. Use of router devices constructed for direct connection of local area networks is not envisaged for the connection of local area networks using the IPoA method.

SUMMARY OF THE INVENTION

It is accordingly an object of the invention to provide a method and device for transmitting data from a first router device through a communications network to at least one further router device that overcomes the hereinafore-mentioned disadvantages of the heretofore-known devices and methods of this general type and that can be realized at low implementation cost. A network gateway unit to implement the method is also provided.

With the foregoing and other objects in view, there is provided, in accordance with the invention, a method for transmitting data from a first router device, connected to a communications network through a network gateway unit, through the communications network to a second router device, including the steps of providing a hardware address according to a routing protocol used to identify a second router device located downstream with respect to a data path leading to a transmission destination, allocating the hardware address to data to be transmitted with the first router device dependent upon the transmission destination of the data, transmitting the hardware address and the data from the first router device to the network gateway unit, checking, with the network gateway unit, whether or not the transmitted hardware address matches a hardware address stored in a memory of the network gateway unit and, in the event of a positive check result allocating a network address to the data with the network gateway unit, the network address being allocated to the transmitted hardware address in the network gateway unit and identifying an exit point of the communications network, forwarding the network address and the data from the network gateway unit into the communications network after conversion according to a transmission protocol used in the communications network, and transmitting the data from the communications network to the exit point defined by the network address, the exit point being where the data is fed to the second router device.

To transmit data from a first router device through a communications network to a second router device, the first router device is connected through a network gateway unit to the communications network. The network gateway unit is used, inter alia, for conversion between a transmission protocol used by the first router device and a transmission protocol that differs therefrom and that is used in the communications network.

By the invention, local area networks can be connected in a simple manner through connected router devices, which are connected through a communications network by network gateway units. An essential advantage of the invention is that conventional router devices configured for direct connection of local area networks can be used to carry out the method. The configuration is achieved, inter alia, in that the network gateway unit receives hardware addresses that are transmitted by the first router device and are actually provided to identify network devices of a local area network, and receives data allocated to the hardware addresses vicariously for these network devices. A received hardware address is used by the network gateway unit to define a network address that is allocated to the hardware address in the network gateway unit and identifies an exit point of the communications network. Using the network address, the data is transmitted through the communications network to the exit point, where the data is fed to the second router device. Through the direct allocation of network addresses to hardware addresses in the network gateway unit, a network address can be defined in a very simple manner using a hardware address, e.g., by accessing an allocation table. In contrast, definition of a network address of an exit point using an IP address of data to be transmitted would be significantly more expensive. Because an IP address designates a transmission destination at the end of a transmission chain and essentially any device provided with an IP address could be addressed worldwide, direct allocation of IP addresses to network addresses of exit points is inappropriate. In contrast thereto, the number of hardware addresses to be administered by a network gateway unit according to the invention is limited in that hardware addresses are actually provided only for addressing network devices that can be directly reached, so that direct allocation of hardware addresses to network addresses is possible at low memory cost.

In accordance with another mode of the invention, the second router device is connected through a second network gateway unit as an exit point to the communications network, a hardware address identifying the second router device is allocated to the data with the second network gateway unit, and the data is transmitted from the second network gateway unit to the second router device.

In accordance with a further mode of the invention, the second router device is connected through a second network gateway unit as the exit point to the communications network, the hardware address identifying the second router device is allocated to the data with the second network gateway unit, and the data is transmitted from the second network gateway unit to the second router device.

In accordance with an added feature of the invention, the second router device is connected to the communications network as the exit point identified by the network address, and the data is received from the communications network with the second router device.

In accordance with an additional mode of the invention, a first local area network is connected to the first router device, connecting a second local area network to second router device, and the data is transmitted from the first local area network through the first router device to the second router device and from the second router device into the second local area network.

According to an advantageous further development of the invention, an allocation table (in which one or more hardware addresses, respectively allocated to a network address, are stored) can be provided in the network gateway unit. Thus, a network address can be allocated to a hardware address arriving from the first router device through table access that can be quickly executed.

In accordance with yet another feature of the invention, in an allocation table, hardware addresses identifying router devices are stored, the hardware addresses being respectively allocated to one of network addresses, and the network address is allocated to the transmitted hardware address in the network gateway unit using the allocation table.

In accordance with yet a further mode of the invention, an IP address of a router device identified by the respective one of the hardware addresses is stored in the allocation table, the respective one of the hardware addresses being allocated to a hardware address stored in the allocation table and provided for identification of the router device.

An IP address of the router device identified by the hardware address concerned can also be allocated in the allocation table to each hardware address contained therein. The additional allocation allows inquiries from the first router device relating to the hardware address of a router device identified by an IP address contained in the inquiry to be answered by the network gateway unit—vicariously for the router device concerned. Such inquiries may be made, for example, using the address resolution protocol (ARP) protocol. Based upon the vicarious response to such inquiries by the network gateway unit, no inquiries that are to be made through the communications network are required in a router device concerned. The communications network load, in particular, is thereby reduced.

In accordance with yet an added mode of the invention, with the network gateway unit, an inquiry of the first router device relating to a hardware address of a router device identified by an IP address contained in the inquiry is answered and the hardware address allocated to the relevant IP address in the allocation table is transmitted from the network gateway unit to the first router device.

In accordance with yet an additional mode of the invention, the hardware address is a medium access control address.

In accordance with again another mode of the invention, the data in the communications network is transmitted through preexisting connections.

In accordance with again a further mode of the invention, the data in the communications network is transmitted through connections set up on demand.

With the objects of the invention in view, in a communications system having router devices, a first of the router devices being connected to a communications network through a network gateway unit, the communications network utilizing a transmission protocol, the network gateway unit transmitting data from a first router device through the communications network to another one of the router devices, there is also provided a network gateway unit including an allocation table for storing hardware addresses each respectively allocated to a network address and identifying an exit point of the communications network to a relevant one of the router devices, the first router device using the hardware addresses to identify another one of the router devices, an address-checking device determining if a hardware address arriving from the first router device matches one of the hardware addresses in the allocation table, the address-checking device connected to the allocation table, an address allocation device allocating data arriving from the first router device, the data being allocated to a respective one of the hardware addresses, to a network address allocated to the respective one of the hardware addresses in the allocation table, the address allocation device connected to the allocation table, and a protocol conversion device converting and transmitting the data arriving from the first router device according to the transmission protocol, the network address allocated to the data being used as address information, the protocol conversion device connected to the address-checking device and to the address allocation device.

In accordance with again an added feature of the invention, each of the router devices has an IP address and an IP address of one of the router devices identified by a relevant hardware address is allocated in the allocation table to one of the hardware addresses recorded in the allocation table.

In accordance with again an additional feature of the invention, the first router device sends inquiries including a given IP address, the inquiries each relating to a hardware address of one of the router devices identified by the given IP address, and an address resolution device answers the inquiries from the first router device by searching for the respective one of the hardware addresses allocated to the given IP address in the allocation table and transmits the respective one of the hardware addresses to the first router device.

In accordance with still another feature of the invention, there is provided an entry device or means for entering address information into the allocation table, the entry device connected to the allocation table.

In accordance with a concomitant feature of the invention, the communications network is an asynchronous transfer mode network.

Other features that are considered as characteristic for the invention are set forth in the appended claims.

Although the invention is illustrated and described herein as embodied in a method and device for transmitting data, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

BRIEF DESCRIPTION OF THE DRAWINGS

FIG. 2 is a block circuit diagram of a network gateway unit of FIG. 1.

DESCRIPTION OF THE PREFERRED EMBODIMENTS

Figure 1:
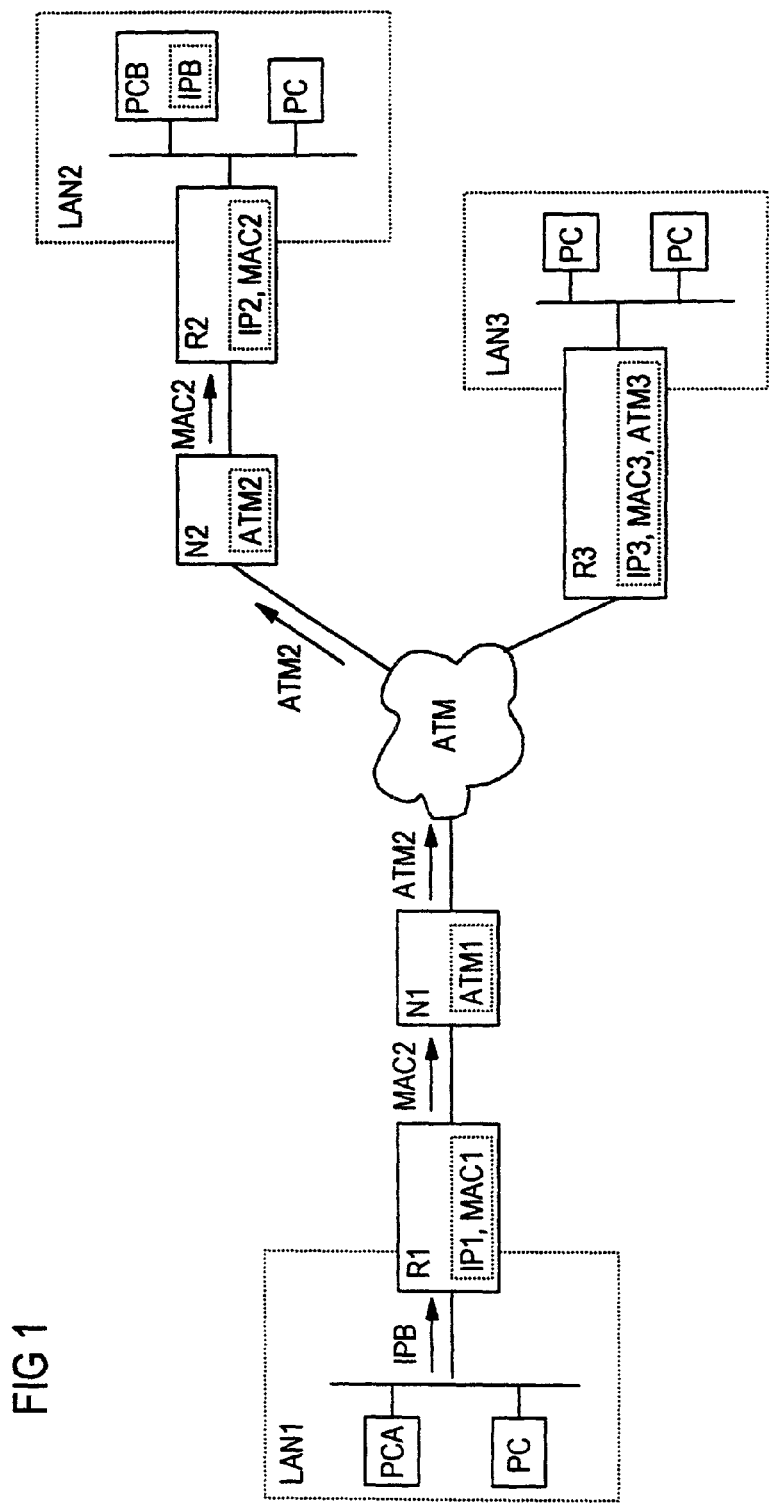
FIG. 1 is a block circuit diagram of three local area networks connected through an ATM network according to the invention.

Referring now to the figures of the drawings in detail and first, particularly to FIG. 1 thereof, there is shown three local area networks LAN1, LAN2 and LAN3 connected through an ATM network ATM as an external communications network. The local area networks LAN1, LAN2 and LAN3 respectively includes a plurality of personal computers PC, PCA, PCB that are locally connected, e.g., through Ethernet or fiber distributed data interface (FDDI), and that are connected respectively through a router device R1 or R2 or R3 to the ATM network ATM. Whereas the router device R1 of the local area network LAN1 and the router device R2 of the local area network LAN2 are connected respectively to the ATM network ATM through a network gateway unit N1 or N2, the router device R3 of the local area network LAN3 is directly connected to the ATM network ATM. The router devices R1 and R2 are conventional router devices, which are actually configured for direct connection of local area networks. In contrast thereto, the router device R3, due to its direct connection to the ATM network ATM, must have not only conventional router functionality, but also a device for protocol conversion between a transmission protocol used in the ATM network ATM and a transmission protocol used in the local area network LAN3.

A medium access control address MAC1, MAC2, or MAC3 is allocated respectively by the manufacturers as a hardware address to the router devices R1, R2, and R3 in the indicated sequence, and an IP address IP1, IP2, or IP3 is also respectively allocated by the system administration. Furthermore, an ATM address ATM3 is also allocated to the router device R3 and an ATM address ATM1 or ATM2 is allocated respectively as a network address to the network gateway units N1 and N2. The IP address IPB is furthermore allocated to the personal computer PCB. The router devices R1, R2, and R3, the network gateway units N1 and N2, and the personal computer PCB are in each case uniquely identified by the respective allocated addresses MAC1, MAC2, MAC3, IP1, IP2, IP3, IPB, ATM1, ATM2, or ATM3.

FIG. 2 schematically shows the network gateway unit N1, through which the router device R1 is connected to the ATM network ATM. As functional components, the network gateway unit N1 contains a central controller ZS with a protocol conversion device PU, an address-checking device AP, and an address allocation device AZ. The address-checking device AP and the address allocation device AZ are connected respectively to the central controller ZS and, furthermore, have access to an allocation table ZT similarly contained in the network gateway unit N1. The allocation table ZT, which can be stored, for example, in a reserved part of a memory, contains, in the exemplary embodiment, at least three entries corresponding to the number of connected local area networks LAN1, LAN2 and LAN3:
  a first entry with the IP address IP1, the MAC address MAC1, and the ATM address ATM1;
  a second entry with the IP address IP2, the MAC address MAC2, and the ATM address ATM2; and a third entry with the IP address IP3, the MAC address MAC3 and the ATM address ATM3.

The elements of each entry are allocated to one another and stored.

A data exchange between the local area networks that is required for the connection of the local area networks LAN1, LAN2, and LAN3 is examined below, using the example of a data transmission from the local area network LAN1 to the local area network LAN2.

To transmit data from a personal computer PCA located in the local area network LAN1 to a destination personal computer PCB located in the local area network LAN2, the data is transmitted in the form of data packets with the IP address IPB of the destination personal computer PCB to the router device R1. The router device R1, using a non-illustrated routing table contained therein, determines that the destination personal computer PC2 identified by the IP address IPB can be reached through the router device R2 and, consequently, provides the data packets that are to be transmitted with the MAC address MAC2 of the router device R2.

The IP address IPB of the destination personal computer PCB is retained unchanged in the data packets. The data packets are then forwarded from the router device R1 to the network gateway unit N1.

In the network gateway unit N1, the address-checking device AP checks whether or not the received MAC address MAC2 is contained in the allocation table ZT. If so, the ATM address is defined that is allocated to the MAC address MAC2 in the allocation table ZT—in this case ATM2—and that serves to identify the network gateway unit N2 through which the router device R2 is connected. The data packets that are to be transmitted are then converted by the protocol conversion device PU, according to the transmission protocol used in the ATM network ATM, into ATM cells to which the ATM address ATM2 is allocated as a network address. The ATM cells are then forwarded into the ATM network ATM and are transmitted from the ATM network ATM to the network gateway unit N2 identified by the ATM address ATM2. The transmission can take place either through one or more dedicated connections (PVC: permanent virtual circuit) or through one or more dial-up connections (SVC: switched virtual circuit), which are to be set up on demand, of the ATM network ATM. In the network gateway unit N2, which similarly contains a non-illustrated allocation table with the same entries as the allocation table ZT, the ATM cells are again converted according to the IP protocol into data packets that are provided with the MAC address MAC2 contained in the allocation table of the network gateway unit N2. The data packets are then forwarded to the router device R2, which identifies the data packets as addressed to itself using the MAC address MAC2 allocated to these data packets. The router device R2 then forwards the received data packets following evaluation of their IP address IPB to the destination personal computer PCB identified by the IP address IPB.

Transmission of data packets from the local area network LAN1 to a destination personal computer PC located in the local area network LAN3 takes place largely analogously, with the difference that the data packets are directly addressed through the ATM address ATM3 to the router device R3. Therefore, the router device R3 must have both protocol conversion functionality and routing functionality.

In such an embodiment, the network gateway unit N1 has not only a data transmission function but also the function of answering inquiries to network gateway devices relating to their respective MAC address, e.g., in the frequently used address resolution protocol (ARP) protocol, vicariously for the respective network gateway device. In such an inquiry, an IP address is transmitted from the inquiring router device R1 to all connected network gateway devices, with the task of transmitting the MAC address of the network gateway device identified by the IP address, if known, to the router device R1. For example, an inquiry relating to the MAC address of the router device R2 identified by the IP address IP2 can be transmitted from the router device R1 to the network gateway unit N1. In such a case, the network gateway unit N1 checks whether or not the IP address transmitted with the inquiry, in this case IP2, is contained in the allocation table ZT. If so, the network gateway unit N1 answers the inquiry by transferring the MAC address allocated to such IP address in the allocation table ZT, in this case MAC2, to the inquiring router device R1. The answer is provided vicariously for the network device identified by the IP address, in this case R2.

The router devices R1, R2 are transparently connected by the conversion, carried out in the network gateway units N1, N2, between the transmission protocol used by the router devices R1, R2 and the transmission protocol used in the ATM network ATM, and by the vicarious answering of inquiries relating to MAC addresses by the network gateway units N1, N2. Such a configuration enables a use of low-cost router devices that are actually constructed for direct connection of local area networks.

We claim:

1. A method for transmitting data from a first router device to a second router device, which comprises:
    connecting the first router device to a communications network through a network gateway unit;
    providing a hardware address according to a routing protocol, the hardware address being used to identify the second router device located downstream with respect to a data path leading to a transmission destination of the data;
    allocating the hardware address to the data to be transmitted with the first router device dependent upon the transmission destination of the data;
    transmitting the hardware address and the data from the first router device to the network gateway unit;
    checking, with the network gateway unit, whether or not the transmitted hardware address matches a hardware address persistently or by configuration stored in a memory of the network gateway unit and, in the event of a positive check result:
        allocating a network address to the data with the network gateway unit, the network address being allocated to the transmitted hardware address in the network gateway unit and identifying an exit point of the communications network, the allocated network address being stored persistently or by configuration within the network gateway unit;
        forwarding the network address and the data from the network gateway unit into the communications network after conversion according to a transmission protocol used in the communications network; and
        transmitting the data by the communications network to the exit point by the network address, the exit point being where the data is fed to the second router device.

2. The method according to claim 1, which further comprises:
    connecting the second router device through a second network gateway unit serving as the exit point to the communications network;

allocating the hardware address identifying the second router device to the data with the second network gateway unit; and transmitting the data from the second network gateway unit to the second router device.

3. The method according to claim 1, which further comprises connecting the second router device to the communications network as the exit point identified by the network address; and receiving the data from the communications network with the second router device.

4. The method according to claim 1, which further comprises:

connecting a first local area network to the first router device;

connecting a second local area network to second router device; and transmitting the data:
from the first local area network through the first router device to the second router device; and
from the second router device into the second local area network.

5. The method according to claim 1, which further comprises:

storing, in an allocation table, hardware addresses identifying router devices, the hardware addresses being respectively allocated to one of network addresses; and allocating the network address to the transmitted hardware address in the network gateway unit using the allocation table.

6. The method according to claim 5, which further comprises storing an IP address of a router device identified by the respective one of the hardware addresses in the allocation table, the respective one of the hardware addresses being allocated to a hardware address stored in the allocation table and provided for identification of the router device.

7. The method according to claim 6, which further comprises:

answering, with the network gateway unit, an inquiry of the first router device relating to a hardware address of a router device identified by an IP address contained in the inquiry; and transmitting the hardware address allocated to the relevant IP address in the allocation table from the network gateway unit to the first router device.

8. The method according to claim 1, wherein the hardware address is a medium access control address.

9. The method according to claim 1, which further comprises transmitting the data in the communications network through preexisting connections.

10. The method according to claim 1, which further comprises transmitting the data in the communications network through connections set up on demand.

11. A network gateway unit for connecting a first one of router devices with a communications network, the communications network utilizing a transmission protocol, the network gateway unit transmitting data from the first router device through the communications network to another one of the router devices, the network gateway unit comprising:

an allocation table for storing hardware addresses, being link layer or MAC addresses, each respectively allocated to a network address identifying an exit point of the communications network to a relevant one of the router devices, the first router device using the hardware addresses to identify another one of the router devices;

an address-checking device determining if a hardware address arriving from the first router device matches one of the hardware addresses in said allocation table, said address-checking device connected to said allocation table;

an address allocation device allocating data arriving from the first router device, the data being allocated to a respective one of the hardware addresses, to a network address allocated to the respective one of the hardware addresses in said allocation table, said address allocation device connected to said allocation table; and a protocol conversion device converting and transmitting the data arriving from the first router device according to the transmission protocol, the network address allocated to the data being used as address information, said protocol conversion device connected to said address-checking device and to said address allocation device.

12. The network gateway unit according to claim 11, wherein:

each of the router devices has an IP address; and an IP address of one of the router devices identified by a relevant hardware address is allocated in said allocation table to one of the hardware addresses recorded in said allocation table.

13. The network gateway unit according to claim 12, wherein:

the first router device sends inquiries including a given IP address, the inquiries each relating to a hardware address of one of the router devices identified by the given IP address; and an address resolution device:
answers the inquiries from the first router device by searching for the respective one of the hardware addresses allocated to the given IP address in said allocation table; and
transmits the respective one of the hardware addresses to the first router device.

14. The network gateway unit according to claim 11, including an entry device for entering address information into said allocation table, said entry device connected to said allocation table.

15. The network gateway unit according to claim 11, including a means for entering address information into said allocation table, said entry means connected to said allocation table.

16. The network gateway unit according to claim 11, wherein the communications network is an asynchronous transfer mode network.

* * * * *